United States Patent [19]

Gaev et al.

[11] 3,913,008

[45] Oct. 14, 1975

[54] IMPEDANCE RC-TRANSFORMER

[76] Inventors: Gennady Pavlovich Gaev, Matveevskaya ulitsa, 1, kv. 405; Evgeny Fedorovich Zimin, Yaroslavskoe shosse, 12, kv. 121; Valentin Pavlovich Gaev, Matveevskaya ulitsa, 1, kv. 405, all of Moscow, U.S.S.R.

[22] Filed: Jan. 16, 1974

[21] Appl. No.: 433,886

[52] U.S. Cl. .............. 323/75 A; 323/75 K; 330/175

[51] Int. Cl.[2] .............................................. H03F 1/08

[58] Field of Search ................. 323/74, 75 A, 75 K; 330/175; 333/74

[56] References Cited

UNITED STATES PATENTS

| | | | |
|---|---|---|---|
| 1,745,378 | 2/1930 | Osnos | 323/75 A |
| 2,511,606 | 6/1950 | Tompkins et al. | 330/175 X |

*Primary Examiner*—A. D. Pellinen
*Attorney, Agent, or Firm*—Waters, Schwartz & Nissen

[57] ABSTRACT

An impedance RC-transformer comprising several four-arm RC-bridges connected in series and having therein measuring and energizing diagonals. An initial RC-bridge is provided with a voltage source in its energizing diagonal, the measuring-diagonal vertices thereof being connected, via components different from those of the adjoining arms, to respective measuring diagonal vertices of adjacent bridges. The measuring-diagonal vertex of any other bridge is connected, via components different from those connecting these vertices to the energizing diagonals of the respective preceding bridges, namely to those measuring diagonal vertices of any of the preceding bridges which are also connected to the measuring diagonal of another bridge through a similar component. Output terminals are formed by the vertices of the energizing diagonals of at least two bridges.

4 Claims, 6 Drawing Figures

IMPEDANCE RC-TRANSFORMER

The present invention relates to interstage coupling devices used in radioelectronic equipment that operates in low and very low frequency bands, and more particularly to an impedance RC-transformer.

Known in the art are impedance RC-transformers using four-arm bridges. The opposite arms in these known transformers use similar components and every bridge has a measuring diagonal and an energizing diagonal interconnecting, through their vertices, the bridges in series so that adjoining arms of adjacent bridges are formed by different components, with the exception of a single initial bridge, the energizing diagonal whereof includes a voltage source and each arm of which includes a component similar to that of the adjoining arm of the adjacent bridge.

It should be understood that the terms "similar" and "different," or alternatively "opposite in nature" for the latter, relate to one of two possible elements used in the bridge arms, namely to resistors and capacitors. Either one or the other is used, and when they are identical or "similar," then two resistors or two capacitors are included, as the case may be.

A disadvantage of the known impedance RC-transformers resides in that their voltage transfer ratio at a given frequency exceeds unity only by 10 to 20 per cent. With a given order of the transfer function polynominal, the known transformer circuits are unable to provide maximum possible gain.

Another disadvantage of the known impedance RC-transformers consists in that they requre quite a substantial number of components due to the fact that stage-by-stage arrangements are used to obtain higher voltage transfer ratio values.

It is an object of the present invention to provide an impedance RC-transformer which ensures maximum possible voltage gain at a given frequency and with a fixed value of the order of the transfer function polynomial, using a minimum number of components.

With these and other objects in view, the essence of the present invention resides that in an impedence RC-transformer is provided which comprises a plurality of four-arm bridges the opposite arms whereof are made up of similar components, as was explained before, wherein, each bridge has a measuring diagonal and an energizing diagonal, the vertices whereof interconnect the bridges in series so that adjoining arms of adjacent bridges use different components, with the exception of a single initial bridge, the energizing diagonal whereof includes an input voltage source, and each arm whereof is made up of a component similar to that of the adjoining arm of the adjacent bridge.

According to the invention, the measuring-diagonal vertices of the bridges adjacent to the initial bridge are connected to the measuring diagonal vertices of the initial bridge via a component different from those of the adjoining arms, while the measuring-diagonal vertex of any other subsequent bridge, is connected, via a component different from that connecting this vertex to the energizing diagonal of the preceding adjacent bridge, to that measuring diagonal vertex of any of the preceding bridges, including the intial bridge, is connected to the measuring-diagonal vertex of another bridge via a similar component, output terminals being formed by the vertices of the energizing diagonals of at least two bridges. As explained before, the "similar" components may be all resistors or capacitors, while any pair of "different components" is constituted by a resistor and a capacitor, and vice versa.

It is recommended that the arms of all the bridges except for those of the initial bridge, which are connected to the energizing-diagonal vertices of the preceding adjacent bridge, be made up of at least similar two components and connected in series, while the points of connection between these components be connected to the measuring diagonal of any of the preceding bridges in a manner like the respective vertices of its measuring diagonal.

In a preferred practical embodiment, the inventive impedance RC-transformer comprises several bridges, each having four arms, different adjacent pairs thereof defining the energizing and measuring diagonals, each with a pair of vertices that constitute the respective bridges. Opposite pairs of the arms include identical components. The bridges are successively interconnected in series by the energizing-diagonal vertices, an initial bridge being disposed at the center of the series, followed in both directions by one or more intermediate bridges, and thereafter by a terminal bridge. The voltage source is connected across the energizing-diagonal vertices of the initial bridge while output terminals are connected to the respective outermost energizing-diagonal vertices of the terminal bridges.

The arms of the intermediate bridges include components identical with those of respective adjoining arms of the initial bridge, while the arms of both said terminal bridges include components different from those of respective adjoining arms of the intermediate bridges. The measuring-diagonal vertices of the intermediate bridges are connected to respective measure-diagonal vertices of the initial bridge via components different from those of the respective ones of the adjoining arms of both the intermediate bridges and the initial bridge, while the measuring-diagonal vertices of the terminal bridges are each coupled to respective measuring-diagonal vertices via components identical with those that couple the measuring-diagonal vertices between the intermediate bridges and the initial bridge.

As a selective feature, the invention provides connections between the measuring-diagonal vertices of the terminal bridges either to those of the intermediate bridges or to those of the initial bridge.

As an added, optional inventive feature, at least those arms of the intermediate and terminal bridges which are serially connected to the energizing-diagonal vertices of the respectively preceding initial bridge and intermediate bridges include at least two serially connected identical components, the connection points between these two components being each also connected to the measuring-diagonal vertices of the preceding, preferably the initial, bridge via components identical with those that couple the measuring-diagonal vertices of the same intermediate and terminal bridges to the initial bridge.

The inventive impedance RC-transformer can be used as an interstage coupling device in low-frequency selecttive amplifiers and master oscillators.

The employment of the inventive impedance RC-transformer permits of simplifying the circuitry improving the quality characteristics of selective amplifiers, and since it allows to reduce the number of active components therein, it brings about stability of amplifier characteristics, when influenced by external destabilizing factors, or at least brings it closer to that of the passive circuit components.

Other object of the invention will become apparent from the following description of preferred embodiments thereof given by way of example and taken in conjunction with the accompanying drawings, in which.

Figure 1:
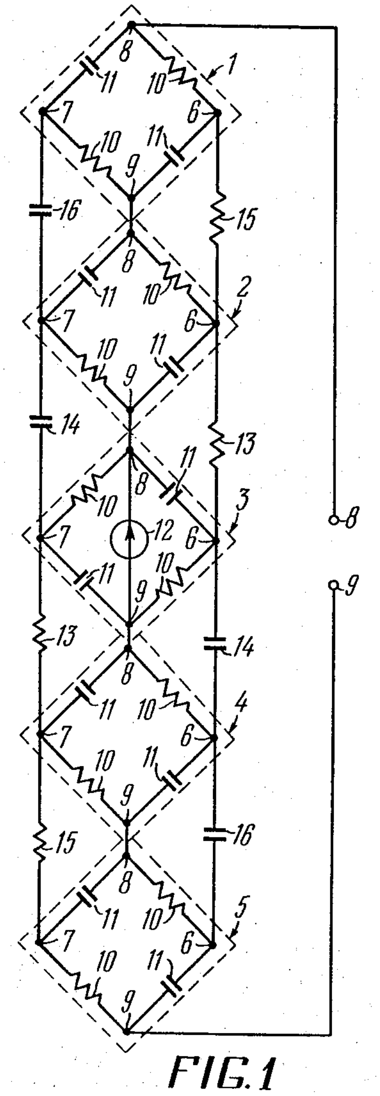
FIG. 1 is a circuit diagram of an impedance RC-transformer according to the invention.

Referring now to the circuit diagram of the first exemplary impedance RC-transformer shown in FIG. 1, the transformer comprises, as a matter of example, five four-arm bridges 1, 2, 3, 4 and 5. Each bridge has four arms, connecting points between pairs there of defining a measuring diagonal with vertices 6 and 7, and an energizing diagonal with vertices 8 and 9. The opposite arms of the bridges 1, 2, 3, 4 and 5 are made up of similar components i.e., one pair of the opposite arms uses resistors 10 while the other uses capacitors 11.

All the bridges 1, 2, 3, 4 and 5 are connected in series through the vertices 8 and 9 of the respective energizing diagonals.

For purposes of a better understanding, the centrally disposed bridge 3 can also be termed an "initial bridge," the adjoining bridges 2 and 4, of which there may be several pairs, "intermediate bridges," and the subsequent bridges 1 and 5 "terminal bridges" in the series connection.

The energizing diagonal of the initial bridge 3 includes an input voltage source 12, this bridge being connected to the adjacent bridges 2 and 4 in such a way that the adjoining arms of the bridges 2, 3 and 4 are formed by the similar components.

The rest of the bridges (1 and 5) are connected to the adjacent bridges (2 and 4, respectively) in such a way that the adjoining arms are formed by components different from or opposite in nature, i.e., by the resistors 10 and the capacitors 11, respectively. The vertices 6 and 7 of the measuring diagonals of the bridges 2 and 4, which are adjacent to the initial bridge 3, are connected respectively to the vertices 6 and 7 of the measuring diagonal of bridge 3 via components different from those of the adjoining arms, i.e., resistors 13 and capacitors 14, respectively.

The measuring diagonal vertices 6 and 7 of the subsequent bridges 1 and 5 are connected via components different from those that associate these vertices 6 and 7 with the energizing diagonal vertex 8 of the respective preceding adjacent bridge (bridge 2 for bridge 1 and bridge 4 for bridge 5, respectively), namely to that vertex 6 or 7 of the measuring diagonals of the preceding bridges 2 and 4 which are connected to the measuring diagonal of the initial bridge 3 via a similar component.

Thus, the measuring diagonal vertex 6, for instance, of the bridge 1, coupled via the capacitor 11 to the energizing-diagonal vertex 8 of the preceding bridge 2, is also connected via a resistor 15 to the measuring-diagonal vertex of the same bridge 2, which vertex is also connected, via the resistor 13, to the vertex 6 of the measuring diagonal of the initial bridge 3.

Besides, the measuring-diagonal vertex 7 of the same bridge 7, connected via the resistor 10 to the energizing diagonal vertex 8 of the preceding bridge 2, is also connected via a capacitor 16 to the measuring diagonal vertex 7 of the bridge 2, which vertex is also connected via the capacitor 14 to the vertex 7 of the measuring diagonal of the initial bridge 3.

Similarly, the measuring-diagonal vertices 6 of the bridges 4 and 5 are interconnected via another capacitor 16 while the vertices 7 of these bridges 4 and 5 are interconnected via another resistor 15.

The energizing diagonal vertices 8 and 9 of the bridges 1 and 5, respectively, form the output terminal of the impedance RC-transformer.

Figure 2:
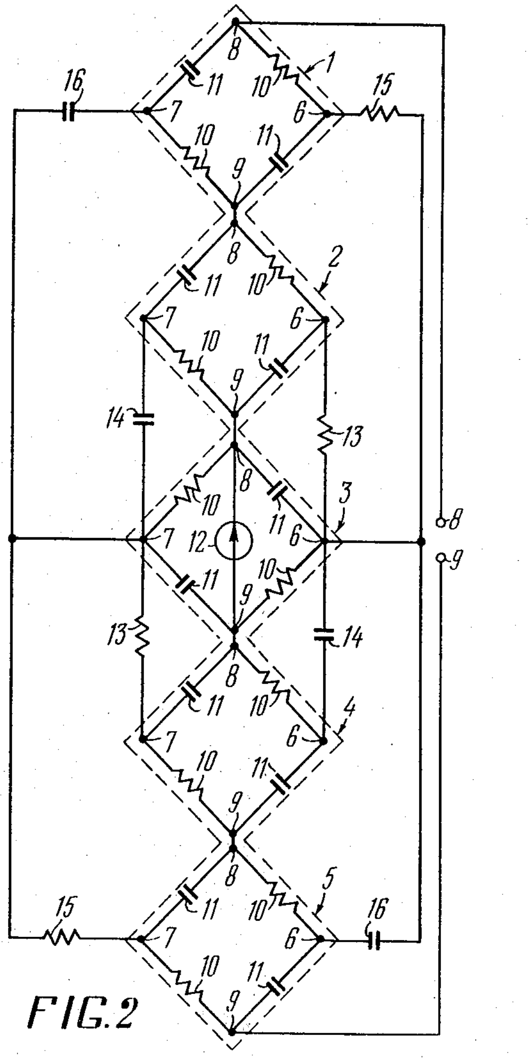
FIG. 2 is a circuit diagram of another embodiment of the impedance RC-transformer according to the invention.

FIG. 2 shows another exemplary embodiment of the impedance RC-transformer circuit, which differs from the one presented in FIG. 1 in that the measuring-diagonal vertex 6 of the bridge 1 is connected via the resistor 15 to the vertex 6 of the initial bridge 3, the vertex 7 of said bridge 1 is coupled via the capacitor 16 to the vertex 7 of the initial bridge 3, while the vertices 6 and 7 of the bridge 5 are coupled via the capacitor 16 and the resistor 15, respectively, to the vertices 6 and 7 of the measuring diagonal of the initial bridge 3.

Figure 3:
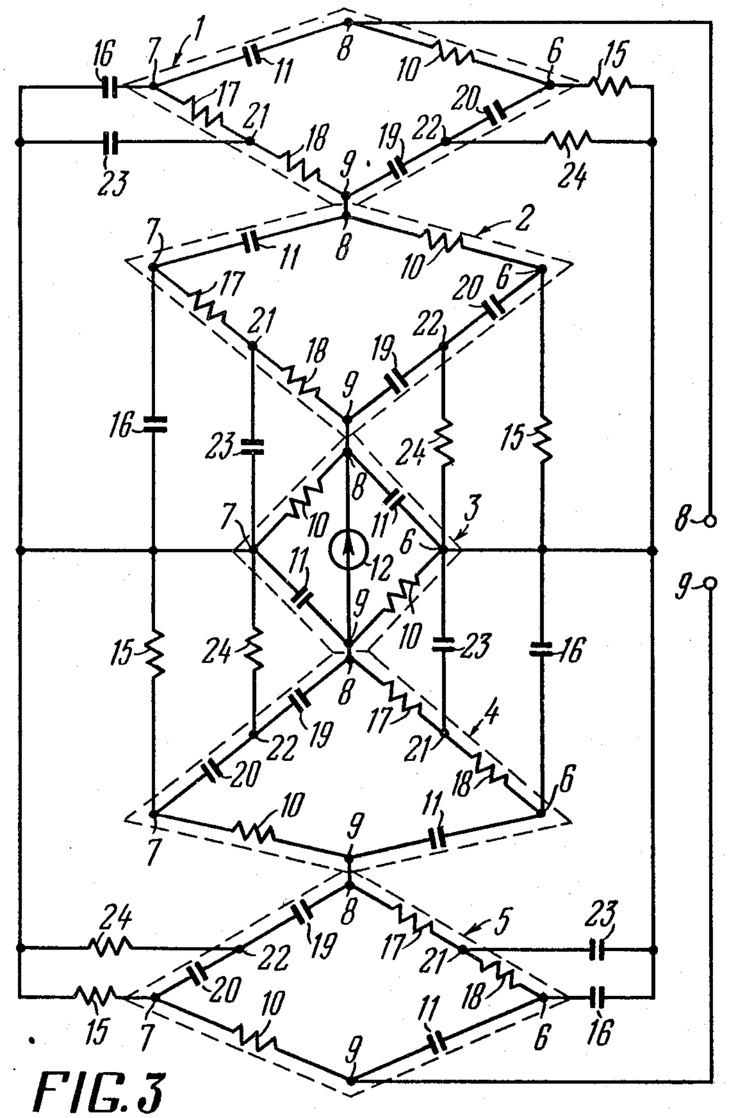
FIG. 3 is a circuit diagram of still another embodiment of the impedance RC-transformer according to the invention.

FIG. 3 presents still another exemplary embodiment of the impedance RC-transformer circuit, which differs from those shown in FIG. 1 and 2 in that the arms of the bridges 1, 2, 4 and 5, which are connected to the energizing-diagonal vertex 8 of the preceding adjacent bridge, use two similar components and connected in series, viz. resistors 17 and 18 and capacitors 19 and 20. Connection points 21 between the resistors 17 and 18 and connection points 22 between the capacitors 19 and 20 of the bridges 1, 2, 4 and 5 are coupled to the measuring-diagonal vertices of the preceding bridges in a manner like the respective measuring-diagonal vertices of the bridges 1, 2, 4 and 5. Thus, the connection point 21 between the resistors 17 and 18 of the bridge 1 is coupled to the vertex 7 of the initial bridge 3 via a capacitor 23, while the connection point 22 between the capacitors 19 and 20 of the bridge 1 is coupled to the vertex 6 of the initial bridge 3 via a resistor 24.

Figure 4:
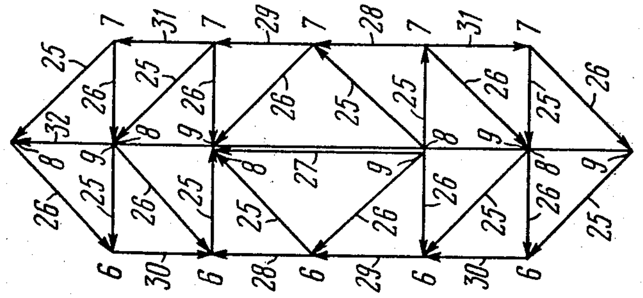
FIG. 4 is a vector diagram illustrating the operation of the first embodiment of the impedance RC-transformer (FIG. 1) according to the invention.

Referring to FIG. 4, the first exemplary impedance RC-transformer operates as follows. The vertices 8 and 9 (FIG. 1) of the energizing diagonal of the initial bridge 3 are fed with the input voltage from the source 12. If it is assumed that the components of the subsequent RC-bridges are selected so that they produce no shunting effect on the preceding bridges, the voltage drop across the capacitor 11 between the vertices 7 and 9 of the initial bridge 3 will be represented by the vector 25 in the vector diagram of FIG. 4. The arrowhead of the vector 25 indicates the potential of the vertex 7, while the beginning of the vector indicates the potential of the vertex 9.

The voltage drop across the resistor 10 between the vertices 7 and 8 of the initial bridge 3 corresponds to a vector 26.

The geometrical sum of the vectors 25 and 26 gives a vector 27 representing the input voltage of the source 12. The voltage drops between the vertices 6 and 9 and between the vertices 6 and 8 are represented by the vectors 26 and 25, respectively.

The potential of the vertex 9 of the subsequent bridge 2 coincides with that of the vertex 8. The voltage drop across the resistor 13 between the vertices 6 of the bridges 2 and 3 is represented by a vector 28, while a vector 29 indicates the voltage drop across the capacitor 14 between the vertices 7 of the same bridges 2 and 3. The voltage drops across the resistors 10 of the other bridges 1, 2, 4 and 5 are also represented by the vectors 26 while those across the capacitors 11 of the same bridges, by the vectors 25.

The voltage drop across the capacitor 14 (still referring to FIG. 1) between the vertices 6 of the bridges 3 and 4 are also indicated by the vectors 29 (again FIG. 4), while that across the resistor 13 between the vertices 7 of the same bridge 3 and 4, by the vector 28.

The voltage drops across the resistors 15 are represented by vectors 30, while those across the capacitors 16, by vectors 31.

The geometrical sum of all these vectors is a vector 32 (FIG. 4) which represents the output of the impedance RC-transformer as shown in FIG. 1. The vector diagram indicates that the voltage transfer ratio K which relates the output 32 to the input 27 is well in excess of unity, while the maximum value of the voltage transfer ratio *K* is $$K = \frac{n_1 + n_2}{2} + 1$$

wherein $n_1$ is the number of four-arm RC-bridges subsequent to the initial bridge, $n_2$ is the number of four-arm RC-bridges preceding the initial bridge.

Thus, an arrangement comprising five bridges will have a transfer ratio $K = 3$.

Figure 5:
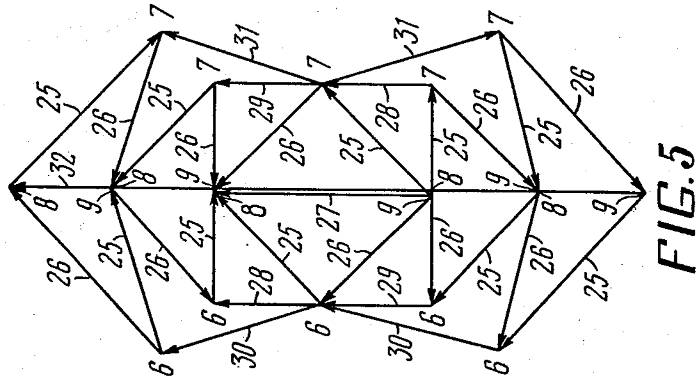
FIG. 5 is a vector diagram illustrating the operation of the second embodiment (FIG. 2) according to the invention.

The operation of the second embodiment of the impedance RC-transformer circuit shown in FIG. 2 is illustrated by the vector diagram of FIG. 5. The resistors 15 and the capacitors 16 are fed with higher voltages than in the first example, which are represented by the differently shown vectors 30 and 31, respectively. The output of the impedance RC-transformer as represented again by the vector 32 is consequently higher than that of the impedance RC-transformer shown in FIG. 1, while the number of components in the two circuits is the same. Hence, the voltage transfer ratio of the impedance RC-transformer shown in FIG. 2 exceeds that of FIG. 1.

Figure 6:
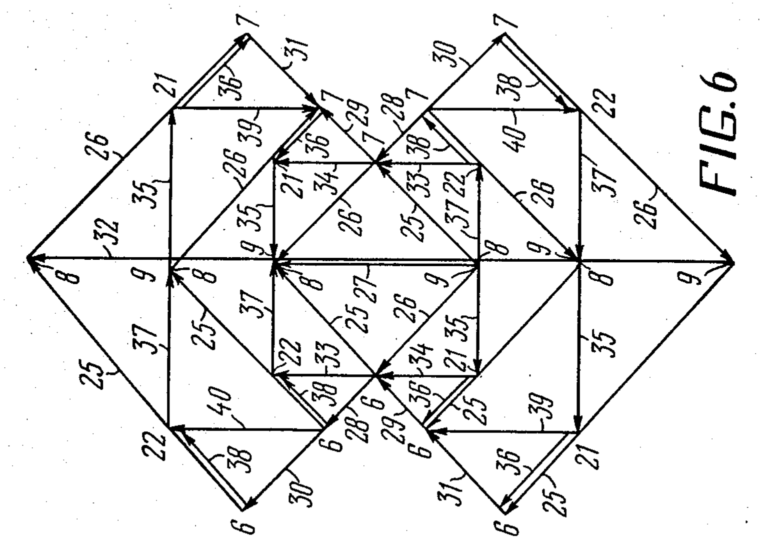
FIG. 6 is a vector diagram illustrating the operation of the third embodiment (FIG. 3).

The operation of the third embodiment of the impedance RC-transformer presented in FIG. 3 is illustrated by the vector diagram of FIG. 6. The latter differs from the diagram of FIG. 5 in that additional vectors 33 indicate voltage drops across the resistors 24, vectors 34 show, voltage drops across the capacitors 23, while additional vectors 35, 36 relate to the resistors 17 and 18, vectors 37, 38 indicate similar voltage drops across the capacitors 19 and 20, and finally vectors 39 and 40 relate to voltage drops across the capacitors 23 and resistors 24, respectively.

As is seen from the diagram, when the voltage transfer ratio K is greater than 7, the number of components in the impedance RC-transformer of FIG. 3 will be less than that of the components in the impedance RC-transformers shown in FIGS. 1 and 2. The maxium value of the voltage transfer ratio K of the impedance RC-transformer shown in FIg. 3 is $$K = \left(\frac{3}{2}\right) n_1 + \left(\frac{3}{2}\right) n_2 - 1$$

wherein $n_1$ and $n_2$ are the numbers of four-arm RC-bridges that are subsequent to and precede, respectively, the initial bridge.

The advantage of the impedance RC-transformer circuits shown in FIGS. 1, 2 and 3 consists in that they all allow to obtain current transfer ratio values well in excess of unity in case the current source is connected between the vertex 8 of the bridge 1 and the vertex 9 of the bridge 5 in all circuits, and the output current is measured between the vertices 8 and 9 of the energizing diagonal of the initial bridge 3.

The proposed impedance RC-transformer can be used in low or very low frequency selective amplifiers and sine master oscillators.

The proposed impedance RC-transformer makes it possible to design selective amplifiers and master oscillators whose characteristics are almost as highly stable as those of passive circuit components.

Another advantage of the proposed impedance RC-transformer is that it has a high value of voltage transfer ratio and a small number of circuit components.

What is claimed is:

1. An impedance RC-transformer comprising, in combination: several bridges; each bridge having therein four arms, different adjacent pairs thereof defining an energizing diagonal and a measuring diagonal, each with a pair of vertices that together constitute the respective bridges; opposite pairs of arms in said bridges including identical components; said bridges being successively interconnected in series by the vertices of their energizing diagonals, an initial bridge being disposed at the center of the series, followed in both directions by at least one intermediate bridge, and thereafter by a terminal bridge; a voltage source connected across said energizing-diagonal vertices of the initial bridge; and output terminals connected to the respective outermost ones of said energizing-diagonal vertices of the terminal bridges; the arms of said intermediate bridges including components identical with those of respective adjoining arms of said initial bridge, while the arms of said terminal bridges include components different from those of respective adjoining arms of said intermediate bridges; the measuring-diagonal vertices of said intermediate bridges being each connected to respective measuring-diagonal vertices of said initial bridge via components different from those of the respective ones of said adjoining arms of both the intermediate bridges and the initial bridge, while said measuring-diagonal vertices of the terminal bridges are each coupled to respective measuring-diagonal vertices via components identical with those that couple said measuring-diagonal vertices between said intermediate bridges and said initial bridge.

2. The impedance RC-transformer as defined in claim 1, wherein said measuring-diagonal vertices of the terminal bridges are each connected to said measuring-diagonal vertices of the intermediate bridges.

3. The impedance RC-transformer as defined in claim 1, wherein said measuring-diagonal vertices of the terminal bridges are each also connected to said measuring-diagonal vertices of the initial bridge.

4. The impedance RC-transformer as defined in claim 3, wherein at least those arms of said intermediate and of said terminal bridges which are serially connected to said energizing-diagonal vertices of the respectively preceding initial bridge and intermediate bridges include at least two serially connected identical components; and connection points between said two components are each also connected to said measuring-diagonal vertices of the initial bridge via components identical with those that couple measuring-diagonal vertices of the same intermediate and terminal bridges to said initial bridge.

* * * * *